United States Patent
Fee et al.

[11] Patent Number: 6,104,514
[45] Date of Patent: Aug. 15, 2000

[54] DISPERSION BASED METHOD OF AND APPARATUS FOR REDUCING UNWANTED MIXING PRODUCTS ON MULTIPLEXED OPTICAL COMMUNICATION LINES

[75] Inventors: John A. Fee, Plano; Laszlo I. Szerenyi, Dallas, both of Tex.

[73] Assignee: MCI Communications Corporation, Washington, D.C.

[21] Appl. No.: 08/947,360

[22] Filed: Oct. 8, 1997

[51] Int. Cl.[7] .................................................. H04B 10/00
[52] U.S. Cl. ........................... 359/161; 359/124; 359/133
[58] Field of Search ..................................... 359/161, 124, 359/133; 372/23

[56] References Cited

U.S. PATENT DOCUMENTS 5,600,467  2/1997  Fee ........................................... 359/124

*Primary Examiner*—Leslie Pascal
*Assistant Examiner*—Hanh Phan

[57] ABSTRACT

A method of and apparatus for reducing unwanted mixing products on multiplexed optical communications lines, based upon the dispersion characteristics of the particular optical transmission line, in which a plurality of optical carriers are transmitted at substantially equally spaced apart frequencies over an optical fiber. When an unwanted mixing product is detected, a set of carriers that can be involved in producing the unwanted mixing product is determined. A carrier of the set is selected based upon the dispersion characteristics of fiber, and the frequency of the selected is shifted to eliminate the unwanted mixing product.

10 Claims, 3 Drawing Sheets

DISPERSION BASED METHOD OF AND APPARATUS FOR REDUCING UNWANTED MIXING PRODUCTS ON MULTIPLEXED OPTICAL COMMUNICATION LINES

FIELD OF THE INVENTION

The present invention relates generally to optical communications, and more particularly to a method of and apparatus for reducing unwanted mixing products in optical communications systems that transmit a plurality of wavelength division multiplexed optical signals over an optical transmission line.

DESCRIPTION OF THE PRIOR ART

Optical fiber systems have become the physical transport medium of choice in long distance telephone and data communications networks. Optical fiber systems preferably use wavelength division multiplexing to increase bandwidth. In an optical wavelength length division multiplexing system, several carriers, each separated by a relatively small wavelength separation, are transmitted on the same optical fiber.

The transmission losses for optical fibers of a particular type depend upon the wavelength of the carrier. For example, silica-based optical fibers exhibit low transmission losses in the regions around 1310 nanometers (nm) and 1550 nm. At one time, optical systems were operated around the 1310 nm wavelength. However, with the advent of erbium-doped fiber amplifiers, which amplify optical signals in a band from about 1530 nm to about 1560 nm, operators have begun to use the 1530 nm to 1560 nm band for transmitting wavelength division multiplexed optical signals. With a channel separation of about 100 GHz, about 37 separate wavelength channels can be accommodated and the 1530 nm to 1565 nm amplification region for erbium-doped fiber amplifiers.

One problem in optical communications systems is caused by chromatic dispersion. All pulses of finite temporal duration have a finite spectral width. Thus, although an optical channel or signal has a nominal wavelength, during production or modulation of the signal, higher and lower wavelength components are introduced into the signal, and the shorter the pulse and time, the wider the spectral width in the frequency domain. Because of the refractive nature of optical fiber, the different frequency components of the signal travel at different speeds through the fiber, which results in chromatic dispersion. Accordingly, a narrow pulse produced at an optical transmitter has a tendency to spread or broaden as it travels over the optical fiber. At transmission speeds as high as 10 Gpbs, pulses are very narrow and closely spaced. Systems working at that data rate can tolerate only a small amount of chromatic dispersion without severely affecting the bit error rate of the signal.

Chromatic dispersion can be at least partially compensated for in several ways. One partial solution to chromatic dispersion is to use dispersion compensating optical fibers. By inserting an appropriate length of dispersion compensating fiber into an optical system, dispersion for signals at a particular wavelength can be compensated. Another partial solution to chromatic dispersion is to construct the optical fiber such that its zero dispersion wavelength ($\lambda_0$) is at or near the wavelength of one of the operating carriers.

Neither solution is entirely satisfactory in wavelength division multiplexed systems, because compensation is achieved for only one carrier. Since the original optical systems operated in the optical band around 1310 nm, earlier fibers were constructed with a zero dispersion wavelength $\lambda_0$ around 1310 nm. When the earlier fibers are used in systems that operate in the band around 1550 nm, dispersion is a severe problem. Accordingly, fiber manufacturers have begun to produce "dispersion shifted" fiber, which has a $\lambda_0$ around 1550. Also, some manufacturers provide "low dispersion slope" fibers that have a $\lambda_0$ around 1520 nm or 1560 nm.

Another problem in optical systems is caused by harmonic distortion or mixing. At high power densities, optical fiber exhibits nonlinear behavior. Thus, at high power, harmonics of the carriers are generated and mixing or harmonic distortion between the carriers occurs. In optical systems operating around 1550 nm second order harmonic distortion produces sums and differences that lie outside the band of interest, i.e. differences are in the microwave region and sums are in or near the visible region. However, higher order harmonic distortion can produce mixing products within the band of interest. In one type of higher order harmonic distortion, a signal in the band of interest ($F_B$) interferes with a second harmonic of another signal in the band of interest ($F_A$) to produce a mixing product with a frequency $F_M$ which is equal to $2F_A+F_B$. In another type of higher order harmonic distortion, known as four-wave mixing, a mixing product with a frequency $F_M$ is produced by the interaction of three fundamental frequencies in the band of interest according to the equation $F_M=F_A+F_B-F_C$. By inspection, if the carriers are equally spaced apart in the frequency spectrum, then either of the foregoing types of high order distortion is guaranteed to produce unwanted mixing products at a frequency equal to at least one of the carriers. Unwanted mixing products could be eliminated by adopting channel plan in which none of the channels are space equally apart from one another, but it is desirable to the channels as evenly spaced as possible.

Dispersion and mixing are related to each other in the sense that mixing occurs where dispersion is low. Dispersion disrupts the phase coherence that is necessary for mixing to occur. In highly dispersive media, mixing is not a problem. However, dispersion is a severe problem, particularly at high bit rates. When dispersion is reduced, mixing becomes a problem.

SUMMARY OF THE INVENTION

The present invention provides a method of and apparatus for reducing unwanted mixing products on multiplexed optical communications lines, based upon the dispersion characteristics of the particular optical transmission line. A plurality of optical carriers are transmitted at substantially equally spaced apart frequencies over an optical fiber. When an unwanted mixing product is detected, a set of carriers that can be involved in producing the unwanted mixing product is determined. A carrier of the set is selected based upon the dispersion characteristics of fiber, and the frequency of the selected is shifted to eliminate the unwanted mixing product.

The dispersion characteristics of the fiber include a zero dispersion frequency and the carrier that is selected from the set is the carrier having a frequency closest to the zero dispersion frequency. The set of carriers is determined by forming a table of mixing products based upon the substantially equally spaced apart frequencies and searching the table for the unwanted mixing product.

DESCRIPTION OF THE PREFERRED EMBODIMENT

Figure 1:
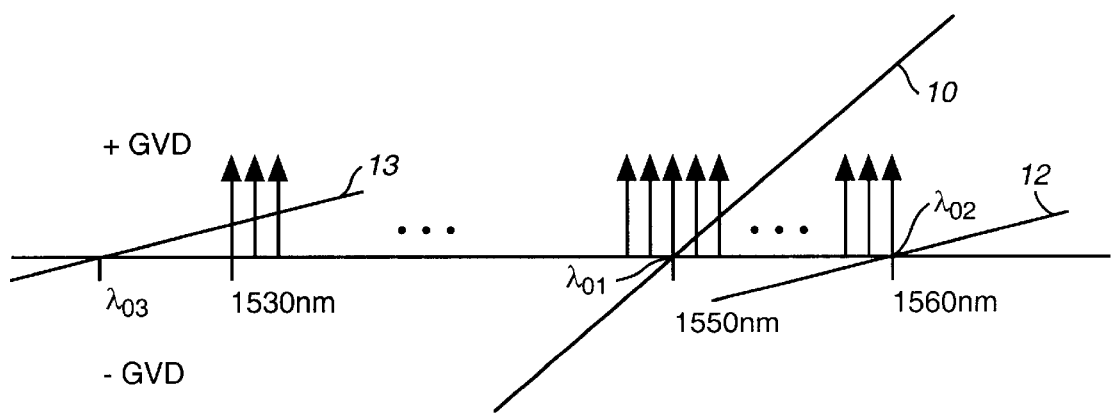
FIG. 1 is diagram of group velocity dispersion versus wavelength for dispersion shifted fiber and low dispersion slope fiber around the 1530 nanometer to 1560 nanometer optical band.

FIG. 1 illustrates plots of group velocity dispersion for dispersion shifted fiber, designated by the numeral 10, and two types of low dispersion slope fiber, designated by the numerals 12 and 13, around the 1530 nm (195.9 THz) to 1560 nm (192.1 THz) band. As shown in FIG. 1, the dispersion shifted fiber is constructed so as to have zero group velocity dispersion at a wavelength $\lambda_{o1}$ near 1550 nm and the low dispersion slope fibers are constructed so as to have zero group velocity dispersion at a wavelength $\lambda_{o2}$ near 1560 nm or $\lambda_{o3}$ near 1520 nm. As represented generally in FIG. 1, the 1530–1560 nm band is divided into a plurality of evenly spaced narrow band optical channels. The 1530–1560 nm band can accommodate 37 narrow band optical channels with a channel spacing of 100 GHZ.

As shown in FIG. 1, for dispersion shifted fiber, the optical channels at the ends of the band are subject to large absolute value dispersion while the channels around $\lambda_{o1}$ experience low dispersion. For one type of low dispersion slope fiber, the optical channels at the low wavelength end of the band are subject to larger absolute value dispersion while the channels at the high wavelength end of the band around $\lambda_{o2}$ experience lower dispersion. For the other type of low dispersion slope fiber, the optical channels at the high wavelength end of the band are subject to larger absolute value dispersion while the channels at the low wavelength end of the band around $\lambda_{o3}$ experience lower dispersion. In any event, mixing is more likely to occur among carriers near the zero dispersion wavelength $\lambda_o$ for the fiber, rather than among the other channels. Additionally, since the channels are equally spaced apart, any mixing products that are produced will be located in a carrier channel.

Figure 2A:
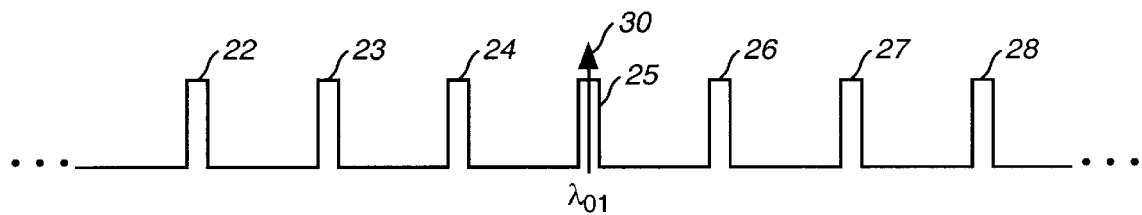
FIG. 2A is a diagram illustrating the presence of an unwanted four-wave mixing product in a portion of the 1530 nanometer to 1560 nanometer optical band.

In FIG. 2A, there is a representation of signal versus wavelength in the middle part of the 1530–1560 nm band around 1550 nm in the case of dispersion shifted fiber. A carrier channel 25 is positioned near zero dispersion wavelength $\lambda_{o1}$. Carrier channel 25 has a center wavelength of 1550 nm and a center frequency of 192.9 THz. Channels 22–24 and 26–28 are spaced at equal separations of about 100 GHz on either side of carrier channel 25. Thus, carrier channels 22–28 range in frequency from 193.2 THz to 192.6 THz. Although only seven carrier channels are shown for purposes of illustration, there are an additional thirty carrier channels to the left and right of carrier channels 22–28, which range in frequency from 195.4 THz to 191.7 THz.

In FIG. 2A, an unwanted mixing product, represented by arrow 30, is shown in carrier channel 25 at 192.9 THz. The frequency of a four-wave mixing product is determined by the equation $F_M = F_A + F_B - F_C$. Mathematically, a four-wave mixing product can be produced by a combination of any of the carriers in the band. For example, the combination of carriers at 191.7, 194.2 and 195.4 THz (1560, 1539.6, and 1530.2 nm, respectively) can produce a mixing product at 192.9 THz (191.7+195.4−194.2=192.9). However, as shown in FIG. 1, carriers at those frequencies are spaced far from the zero dispersion point of the fiber where mixing is less likely to occur, or the magnitude of a mixing product produced by such carriers will be low.

The combination of carriers at frequencies of 193.0, 192.9 and 192.8 THz (1549.2, 1550, and 1550.8 nm, respectively), which correspond to channels 24–26 of FIG. 2A, can also produce a mixing product at 192.9 THz (193.0+192.8−192.9=192.9). Since those carriers are in the low dispersion part of the band, that combination is much more likely to produce the unwanted mixing product.

According to the present invention, all possible mixing products are calculated. Preferably, a look-up table is formed that lists all possible combinations of carriers that can produce a mixing product at each wavelength or frequency of the band. Then, whenever an unwanted mixing product is found, the possible carrier channels that can be combining to cause the mixing product are located in the table. The channels in the table with wavelengths closest to $\lambda_o$ are the ones likely to be involved in the unwanted mixing. According to the present invention, the unwanted mixing product is removed by shifting the frequency of the possible contributor that is closest to the zero dispersion point ($\lambda_o$) of the fiber, or the contributor that generates the greatest optical power. Alternatively, the size of the lookup table can be reduced by including only channels close to $\lambda_o$. In a further alternative, the algorithm may first search for possible contributors close to $\lambda_o$ and then move away from $\lambda_o$ in a sequential fashion.

Figure 2B:
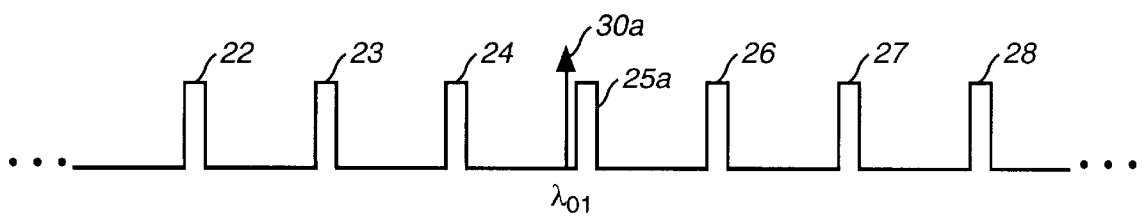
FIG. 2B is a diagram illustrating the mitigation of an unwanted four-wave mixing product according to the method of the present invention.
Figure 3:
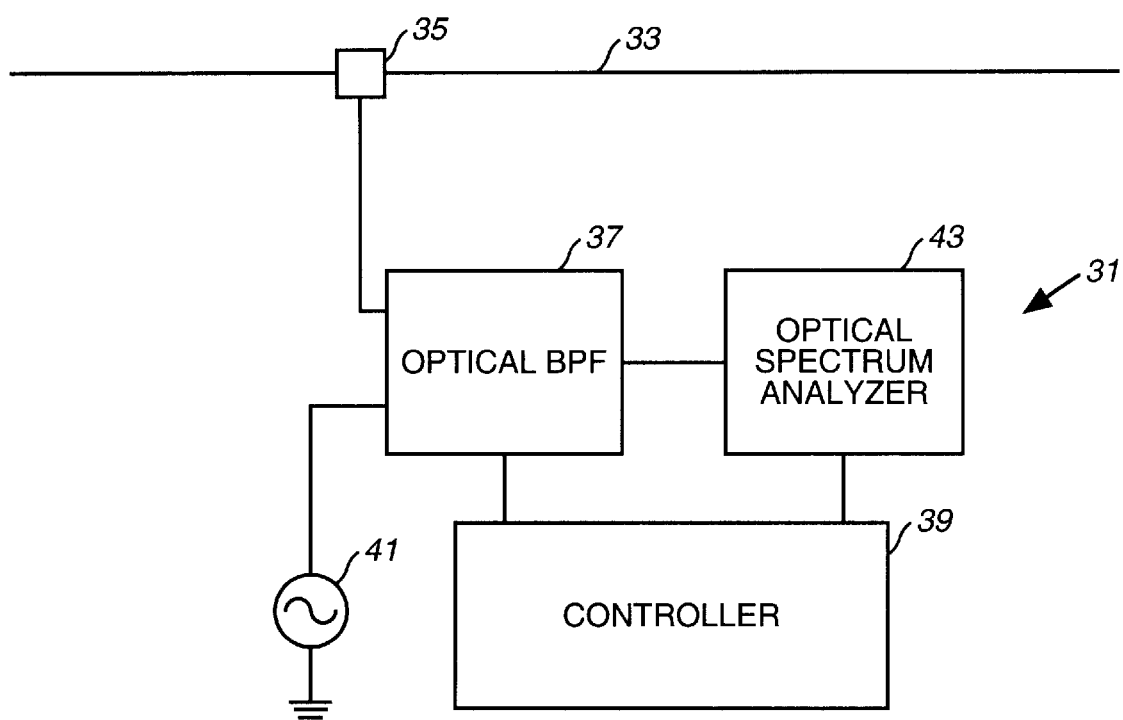
FIG. 3 is a block diagram of a preferred embodiment of the apparatus of the present invention.

Referring to FIG. 2, channel 25 is shown shifted to a new channel 25a having a slightly lower frequency (longer wavelength) corresponding, for example, to 192.875 THz. The shift to channel 25a causes a shift of the mixing product to a position 30a with a frequency of 192.925, which is outside the narrow band of shifted channel 25a. Thus, the unwanted mixing product is eliminated while maintaining the preferred even channel spacing of the remaining channels in the band.

Referring now to FIG. 2, a preferred apparatus for carrying out the method of the present invention is designated generally by the numeral 31. An optical fiber 33 carries a plurality of optical channels together with possible unwanted mixing products. Apparatus 31 includes an optical coupler 35 that diverts a small part of the total optical signal as it travels through fiber 33 and sends it to an optical bandpass filter 37. Optical coupler 35 is a directional coupler with a high splitting ratio, so that only a small part of the optical signal traveling along fiber 33 is tapped. The signal coming out of fiber 33 through coupler 35 is subdivided in wavelength components using a swept optical bandpass filter 37 driven by a controller 39 that is equipped with a stable optical reference signal 41. The resulting family of wavelengths is then evaluated using an optical spectrum analyzer 43 or an optical selective level meter.

Figure 4:
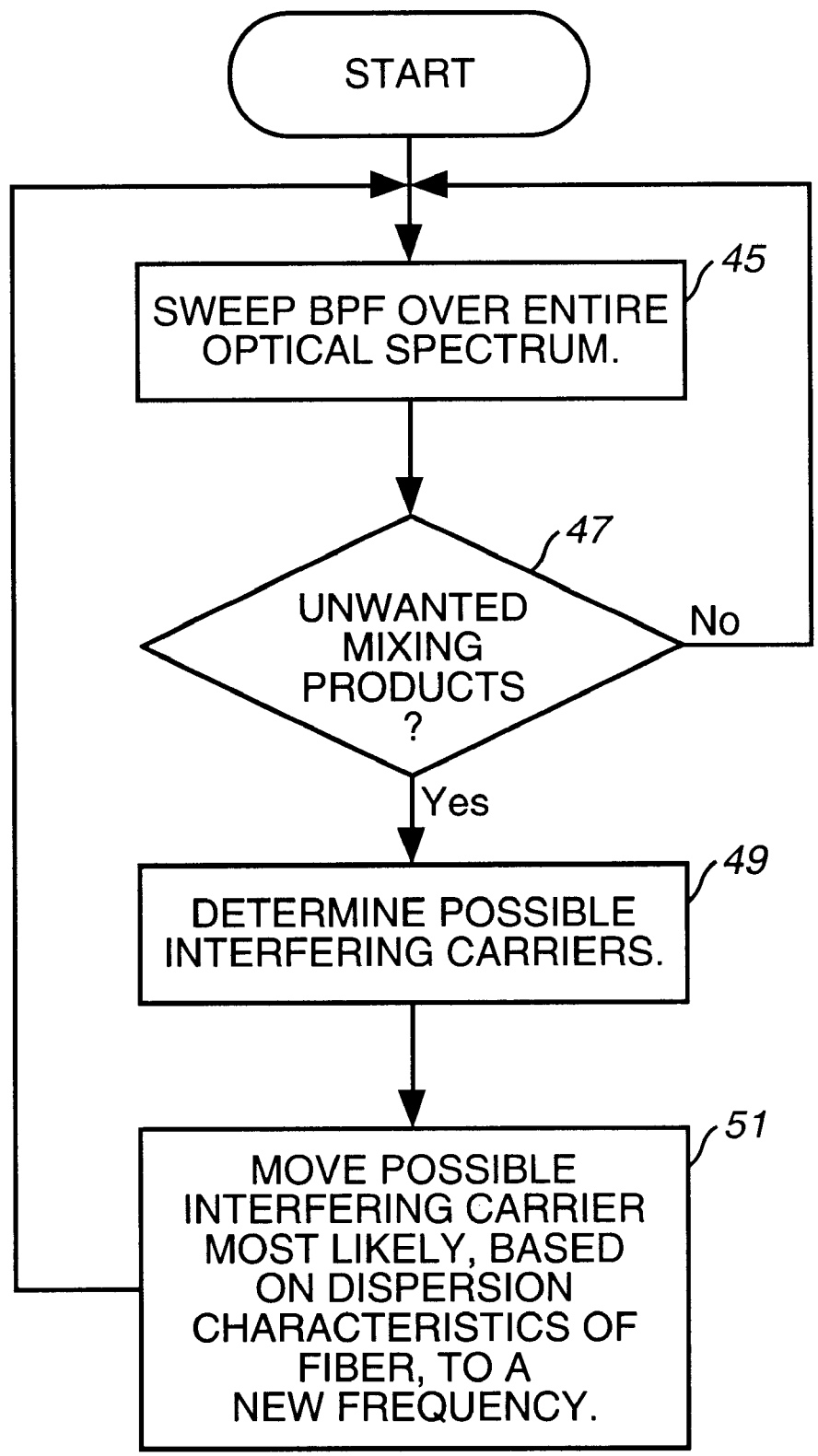
FIG. 4 is a flowchart of the method of the present invention.

The operation of apparatus 31 is illustrated with respect to the flowchart of FIG. 4. At block 45, apparatus 31 sweeps optical bandpass filter 37 over the entire spectrum of interest, which in the preferred embodiment is the 1530–1560 nm band. Then, the apparatus tests whether or not there are any unwanted mixing products, at decision block 47. The apparatus determines the presence of unwanted mixing products with reference to a look up table of wanted and unwanted signals. The unwanted signals are usually lower in strength than the wanted signals. If there are unwanted mixing products, then the apparatus determines possible interfering carriers, at block 49. Preferably, the determination of possible interfering carriers is made with reference to a look-up table of calculated interferences based upon the four-wave mixing equation $F_M = F_A + F_S - F_C$. Step 49 yields a set of possible interfering carriers. Then, at block 51, the apparatus moves the possible interfering carrier that is most likely, based upon the dispersion characteristics of the fiber being used, to be involved in the unwanted mixing, thereby to move the mixing product to a non-interfering position in the spectrum. A good candidate to be most likely to be involved is the carrier closest to the zero dispersion wavelength $\lambda_0$. Thus, for dispersion shifted fiber, the possible carrier closest to 1550 nm is the one most likely to be involved in the unwanted mixing. For one type of low dispersion slope fiber, the possible carrier closest to 1560 nm is the one most likely to be involved in the unwanted mixing; for the other type of low dispersion slope fiber, the possible carrier closest to 1520 nm is the one most likely to be involved in the unwanted mixing. The apparatus uses the four-wave mixing equation $F_M = F_A + F_B - F_C$ to calculate the new frequency $F_{M1}$ of the mixing product based upon the new frequency of $F_A$, $F_B$, or $F_C$, to ensure that the new mixing product is not unwanted. For example, if a carrier with a frequency $F_A$ is the carrier of the set of possible interfering carriers closest to $\lambda_0$, then that carrier is shifted to a new frequency $F_{A1}$, such that $F_{M1} = F_{A1} + F_B - F_C$.

After the system has moved the most likely interfering carrier based upon the dispersion characteristics of the fiber, processing continues at block 45. If, at decision block 47, an unwanted mixing product is detected, the unwanted mixing product cannot be produced by the carrier that was moved to frequency $F_{A1}$. Thus, the moved carrier cannot be included in the set of possible interfering carriers determined at block 49. At block 51, the apparatus moves the possible interfering carrier that now is most likely, based upon the dispersion characteristics of the fiber being used, to be involved in the unwanted mixing, thereby to move the mixing product to a non-interfering position in the spectrum. The present invention maintains, as much as possible, the desired even channel spacing.

Apparatus 31 may be a portable tool with which, using a temporary coupler, the health of an optical communication line can be assessed to ascertain if unwanted mixing products are present and how they should be reallocated to optimize the optical line use. The apparatus can be fully automated or require some human intervention to establish a new set of optical carriers. Thus, the system provides a real-time test of an optical communication channel. By moving the possible interfering carrier that is closest to the zero dispersion point of the fiber the present invention effectively removes unwanted harmonics while maintaining the desired evenly spaced channel plan.

While the present invention has been described in terms of a preferred embodiment, it should be evident to those skilled in the art that variations of the preferred embodiment may be practiced without departing from the scope of the invention. Also, the invention is not limited to use with fibers having the specific zero dispersion wavelengths of the examples. To the contrary, the invention is applicable to use with any fiber that exhibits harmonic mixing.

What is claimed is:

1. A method of transmitting a plurality of optical carriers, each of said carriers having a different frequency, over an optical fiber having dispersion characteristics, which comprises the steps of:

detecting an unwanted mixing product;

determining a set of carriers that can be involved in said unwanted mixing products; and shifting the frequency of a carrier of said set based upon the dispersion characteristics of said fiber to eliminate said unwanted mixing product, wherein said dispersion characteristics of said fiber includes a zero dispersion frequency and said step of shifting the frequency of a carrier based upon the dispersion characteristics of said fiber includes the step of shifting the frequency of the carrier of said set having a frequency closest to said zero dispersion frequency.

2. A method of transmitting a plurality of optical carriers, each of said carriers having a different frequency, over an optical fiber having dispersion characteristics, which comprises the steps of:

detecting an unwanted mixing product;

determining a set of carriers that can be involved in said unwanted mixing products; and shifting the frequency of a carrier of said set based upon the dispersion characteristics of said fiber to eliminate said unwanted mixing product, wherein said carriers, prior to said shifting step, are transmitted on substantially equally space apart frequencies.

3. The method as claimed in claim 2, wherein said step of determining a set of carriers includes the steps of:

forming a table of mixing products based upon said substantially equally spaced apart frequencies; and, p1 searching said table for said unwanted mixing product.

4. The method as claimed in claim 2, wherein said step of detecting an unwanted mixing product includes the step of measuring the optical spectrum of the carriers in said optical fiber.

5. A method of transmitting a plurality of optical carriers over an optical fiber having a zero dispersion frequency, which comprises the steps of:

transmitting said carriers at substantially equally spaced apart frequencies;

detecting an unwanted mixing product;

determining a set of carriers that can produce said unwanted mixing product; and, shifting the frequency of a carrier of said set based upon said zero dispersion frequency to eliminate said unwanted mixing product.

6. The method as claimed in claim 5, wherein said step shifting the frequency of a carrier includes the step of shifting the carrier of said set having a frequency closest to said zero dispersion frequency.

7. The method as claimed in claim 5, wherein said step of determining a set of carriers includes the steps of:

forming a table of mixing products based upon said substantially equally spaced apart frequencies; and, searching said table for said unwanted mixing product.

8. A system for transmitting a plurality of optical carriers over an optical fiber having a zero dispersion frequency, which comprises the steps of:

means for transmitting said carriers at substantially equally spaced apart frequencies;

means for detecting an unwanted mixing product;

means for determining a set of carriers that can produce said unwanted mixing product; and, means for shifting the frequency of a carrier of said set based upon said zero dispersion frequency to eliminate said unwanted mixing product.

9. The system as claimed in claim 8, wherein said means for detecting an unwanted mixing product includes an optical spectrum analyzer.

10. The system as claimed in claim 8, wherein said means for shifting the frequency of a carrier of said set based upon said zero dispersion frequency includes means for shifting the carrier of said set having a frequency closest to said zero dispersion frequency.

* * * * *